US008075407B2

(12) United States Patent
Yamamoto

(10) Patent No.: US 8,075,407 B2
(45) Date of Patent: Dec. 13, 2011

(54) RANKING DETERMINATION SYSTEM AND PROGRAM, AND RECORDING MEDIUM STORING THE PROGRAM

(75) Inventor: Makoto Yamamoto, Tokyo (JP)

(73) Assignee: Sega Corporation, Tokyo (JP)

( * ) Notice: Subject to any disclaimer, the term of this patent is extended or adjusted under 35 U.S.C. 154(b) by 1093 days.

(21) Appl. No.: 11/918,481

(22) PCT Filed: Nov. 24, 2006

(86) PCT No.: PCT/JP2006/323472
§ 371 (c)(1),
(2), (4) Date: Oct. 15, 2007

(87) PCT Pub. No.: WO2007/061067
PCT Pub. Date: May 31, 2007

(65) Prior Publication Data
US 2009/0069091 A1 Mar. 12, 2009

(30) Foreign Application Priority Data
Nov. 24, 2005 (JP) ................................ 2005-338486

(51) Int. Cl.
*G06F 17/00* (2006.01)
*A63F 17/00* (2006.01)
(52) U.S. Cl. ............................................. 463/42; 463/9
(58) Field of Classification Search .................... 700/91; 463/42, 9; 273/299
See application file for complete search history.

(56) References Cited

U.S. PATENT DOCUMENTS

| 7,614,955 | B2 * | 11/2009 | Farnham et al. | 463/42 |
| 2001/0039211 | A1 * | 11/2001 | Yoshizawa | 463/42 |
| 2003/0093168 | A1 * | 5/2003 | Nagaoka | 700/91 |
| 2003/0190960 | A1 * | 10/2003 | Jokipii et al. | 463/42 |
| 2005/0192097 | A1 * | 9/2005 | Farnham et al. | 463/42 |
| 2007/0060325 | A1 * | 3/2007 | Gradek | 463/29 |
| 2007/0243917 | A1 * | 10/2007 | Wojewoda et al. | 463/9 |
| 2007/0243918 | A1 * | 10/2007 | Wojewoda et al. | 463/9 |

FOREIGN PATENT DOCUMENTS

| EP | 1 518 594 A1 | 3/2005 |
| EP | 1 570 887 A1 | 9/2005 |
| JP | 2000-51524 A | 2/2000 |
| JP | 2000-233069 A | 8/2000 |
| JP | 2003-135854 A | 5/2003 |
| JP | 2005-027950 A | 2/2005 |
| WO | WO 02/089937 A1 | 11/2002 |
| WO | WO-03/088161 A1 | 10/2003 |

* cited by examiner

*Primary Examiner* — Masud Ahmed
(74) *Attorney, Agent, or Firm* — Dickstein Shapiro LLP

(57) ABSTRACT

A ranking determination system is provided which can make all the game participants ranking-conscious and eager to play again, even if it is a widely popular game played by a large number of people. In the system wherein results of a game played in multiple game machines are collected through a communication network for ranking purposes, the ranking chart has several levels, each level consisting of one or more groups having a preset number of teams, each team being allocated a region for storing one or more sets of player information. The system is configured such that respective teams of players are ranked based on the game results of their member players.

8 Claims, 13 Drawing Sheets

FIG.3

◇PLAYER INFORMATION DATABASE

110

| ID NO. | NAME | SHOP REGISTRATION NO. | NO. OF TIMES | GAME A RESULT | | GAME B RESULT | | | GAME C RESULT | | | TOTAL | |
|---|---|---|---|---|---|---|---|---|---|---|---|---|---|
| | | | | RANKING | CONTRIBUTION POINT | NO. OF TIMES | RANKING | CONTRIBUTION POINT | NO. OF TIMES | RANKING | CONTRIBUTION POINT | NO. OF TIMES | CONTRIBUTION POINT |
| P00001 | YAMAMOTO | S0001 | 13 | 1 | 820 | 1 | 10 | 10 | 5 | 3 | 3 | 19 | 868 |
| P00002 | TOMITA | S0023 | 2 | 5 | 25 | 15 | 1 | 785 | 3 | 35 | 6 | 20 | 816 |
| P00003 | NAKATANI | S0077 | 1 | 21 | 5 | 2 | 65 | 4 | 8 | 10 | 23 | 11 | 32 |
| P00004 | KOBAYASHI | S0101 | 20 | 2 | 55 | 0 | – | 0 | 2 | 15 | 7 | 22 | 62 |
| P00005 | TANAKA | S0001 | 0 | – | 0 | 1 | 20 | 5 | 0 | – | 0 | 1 | 5 |
| P00006 | NAKAI | S0003 | 5 | 55 | 5 | 10 | 36 | 15 | 1 | 89 | 1 | 16 | 21 |
| P00007 | ... | ... | ... | ... | ... | ... | ... | ... | ... | ... | ... | ... | ... |
| P00008 | | | | | | | | | | | | | |

FIG.4

◇SHOP INFORMATION DATABASE – 1

120

| REGISTRATION NO. | SHOP NAME | AREA | GAME A ||||| GAME B ||||| GAME C ||||| TOTAL |||
|---|---|---|---|---|---|---|---|---|---|---|---|---|---|---|---|---|---|---|
| | | | NO. OF TIMES | SCORE | RANKING | GROUP | NO. OF TIMES | SCORE | RANKING | GROUP | NO. OF TIMES | SCORE | RANKING | GROUP | NO. OF TIMES | SCORE | RANKING | GROUP |
| S0001 | SHOP A | TOKYO | 85 | 1250 | 1 | GA1001 | 66 | 154 | 7 | GB4003 | 75 | 655 | 7 | GC3002 | 226 | 2059 | 4 | GS2001 |
| S0002 | SHOP B | OSAKA | 80 | 720 | 3 | GA2002 | 72 | 650 | 9 | GB3003 | 49 | 132 | 4 | GC5011 | 201 | 1502 | 1 | GS4003 |
| S0003 | SHOP C | SAITAMA | 67 | 286 | 6 | GA4003 | 61 | 131 | 4 | GB5007 | 57 | 111 | 2 | GC6014 | 185 | 528 | 5 | GS5007 |
| S0004 | SHOP D | OKAYAMA | 41 | 169 | 8 | GA4006 | 55 | 157 | 2 | GB5012 | 46 | 126 | 9 | GC5012 | 142 | 452 | 8 | GS5012 |
| S0005 | SHOP E | TOKYO | 105 | 810 | 3 | GA3002 | 94 | 916 | 1 | GB2001 | 92 | 899 | 1 | GC3002 | 291 | 2625 | 1 | GS2001 |
| S0006 | SHOP F | CHIBA | 64 | 73 | 4 | GA7025 | 51 | 103 | 2 | GB6014 | 54 | 118 | 3 | GC6014 | 169 | 294 | 3 | GS6014 |
| S0007 | ... | ... | ... | ... | ... | ... | ... | ... | ... | ... | ... | ... | ... | ... | ... | ... | ... | ... |
| S0008 | ... | ... | ... | ... | ... | ... | ... | ... | ... | ... | ... | ... | ... | ... | ... | ... | ... | ... |

◇SHOP INFORMATION DATABASE – 2

120

| REGISTRATION NO. | SHOP NAME | NO. OF MEMBERS | MEMBER PLAYER ID NO. |||||||||||||
|---|---|---|---|---|---|---|---|---|---|---|---|---|---|---|---|
| S0001 | SHOP A | 10 | P00001 | P00005 | P00088 | P00273 | P00274 | P00275 | P00612 | P00613 | P03052 | P03578 | | | |
| S0002 | SHOP B | 10 | P00009 | P01444 | P01601 | P02771 | P03829 | P03830 | P05417 | P05642 | P05643 | P07007 | | | |
| S0003 | SHOP C | 8 | P00006 | P00014 | P00015 | P00158 | P00174 | P02376 | P02377 | P06381 | | | | | |
| S0004 | SHOP D | 7 | P00012 | P00013 | P04631 | P04632 | P06824 | P06825 | P07028 | | | | | | |
| S0005 | SHOP E | 11 | P00010 | P00025 | P00026 | P00027 | P00028 | P00192 | P00223 | P00368 | P00369 | P00500 | P00501 | | |
| S0006 | SHOP F | 8 | P00017 | P00018 | P00019 | P04633 | P04634 | P06994 | P06995 | P07001 | | | | | |
| S0007 | ... | ... | ... | ... | ... | ... | ... | ... | ... | ... | ... | ... | | | |
| S0008 | | | | | | | | | | | | | | | |

FIG.5

◇GROUP RANKING CHART

GROUP RANKING CHART
⟨ GAME A ⟩

131

| Level | Entries |
|---|---|
| LEVEL1 | GA1001 |
| LEVEL2 | GA2001, GA2002 |
| LEVEL3 | GA3001, GA3002, GA3003, GA3004 |
| LEVEL4 | GA4001, GA4002, GA4003, GA4004, GA4005, GA4006, GA4007, GA4008 |
| LEVEL5 | GA5001, GA5002, GA5003, GA5004, GA5005, GA5006, GA5007, GA5008, GA5009, GA5010, GA5011, GA5012, GA5013, GA5014, GA5015, GA5016 |
| LEVEL6 | GA6001, GA6002, GA6003, GA6004, GA6005, GA6006, GA6007, GA6008, GA6009, GA6010, GA6011, GA6012, GA6013, GA6014, GA6015, GA6016, GA6017, GA6018, GA6019, GA6020, GA6021, GA6022, GA6023, GA6024, GA6025, GA6026, GA6027, GA6028, GA6029, GA6030, GA6031, GA6032 |
| LEVEL7 | GA7001, GA7002, GA7003, GA7004, GA7005, GA7006, GA7007, GA7008, GA7009, GA7010, GA7011, GA7012, GA7013, GA7014, GA7015, GA7016, GA7017, GA7018, GA7019, GA7020, GA7021, GA7022, GA7023, GA7024, GA7025, GA7026, GA7027, GA7028, GA7029, GA7030, GA7031, GA7032, GA7033, GA7034, GA7035, GA7036, GA7037, GA7038, GA7039, GA7040, GA7041, GA7042, GA7043, GA7044, GA7045, GA7046, GA7047, GA7048, GA7049, GA7050, GA7051, GA7052, GA7053, GA7054, GA7055, GA7056, GA7057, GA7058, GA7059, GA7060, GA7061, GA7062, GA7063, GA7064 |

FIG.6

◇IN-GROUP SHOP RANKING CHART    132

LEVEL 1  < GAME A >

GROUP GA1001

| RANKING | SCORE | SHOP NAME |
|---|---|---|
| 1 | 1250 | SHOP A |
| 2 | 1100 | SHOP B |
| 3 | 950 | SHOP C |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

LEVEL 2  < GAME A >

GROUP GA2001

| RANKING | SCORE | SHOP NAME |
|---|---|---|
| 1 | 950 | SHOP D |
| 2 | 925 | SHOP E |
| 3 | 800 | SHOP F |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

GROUP GA2002

| RANKING | SCORE | SHOP NAME |
|---|---|---|
| 1 | 1050 | SHOP G |
| 2 | 885 | SHOP H |
| 3 | 720 | SHOP I |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

LEVEL 3  < GAME A >

GROUP GA3001

| RANKING | SCORE | SHOP NAME |
|---|---|---|
| 1 | ... | ... |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

GROUP GA3002

| RANKING | SCORE | SHOP NAME |
|---|---|---|
| 1 | ... | ... |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

GROUP GA3003

| RANKING | SCORE | SHOP NAME |
|---|---|---|
| 1 | ... | ... |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

GROUP GA3004

| RANKING | SCORE | SHOP NAME |
|---|---|---|
| 1 | ... | ... |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |

FIG.7

◇IN-GROUP PLAYER RANKING CHART

LEVEL 1 < GAME A >

GROUP
GA1001

<u>133</u>

| RANKING | SCORE | PLAYER NAME | SHOP NAME |
|---|---|---|---|
| 1 | ... | ... ... | .. .. .. |
| 2 | ... | ... ... | .. .. .. |
| 3 | ... | ... ... | .. .. .. |
| 4 | ... | ... ... | .. .. .. |
| 5 | ... | ... ... | .. .. .. |
| 6 | ... | ... ... | .. .. .. |
| 7 | ... | ... ... | .. .. .. |
| 8 | ... | ... ... | .. .. .. |
| 9 | ... | ... ... | .. .. .. |
| 10 | ... | ... ... | .. .. .. |
| 11 | ... | ... ... | .. .. .. |
| 12 | ... | ... ... | .. .. .. |
| 13 | ... | ... ... | .. .. .. |
| 14 | ... | ... ... | .. .. .. |
| 15 | ... | ... ... | .. .. .. |
| 16 | ... | ... ... | .. .. .. |
| 17 | ... | ... ... | .. .. .. |
| 18 | ... | ... ... | .. .. .. |
| 19 | ... | ... ... | .. .. .. |
| 20 | ... | ... ... | .. .. .. |
| 21 | ... | ... ... | .. .. .. |
| 22 | ... | ... ... | .. .. .. |
| 89 | ... | ... ... | .. .. .. |
| 90 | ... | ... ... | .. .. .. |
| 91 | ... | ... ... | .. .. .. |
| 92 | ... | ... ... | .. .. .. |
| 93 | ... | ... ... | .. .. .. |
| 94 | ... | ... ... | .. .. .. |
| 95 | ... | ... ... | .. .. .. |
| 96 | ... | ... ... | .. .. .. |
| 97 | ... | ... ... | .. .. .. |
| 98 | ... | ... ... | .. .. .. |
| 99 | ... | ... ... | .. .. .. |
| 100 | ... | ... ... | .. .. .. |

FIG.8

◇SCORE TABLE    134

| RANKING | GAME | | |
|---|---|---|---|
| | A | B | C |
| 1 | 300 | 200 | 100 |
| 2 | 150 | 100 | 50 |
| 3 | 99 | 66 | 33 |
| 4 | 75 | 50 | 25 |
| 5 | 60 | 40 | 20 |
| 6 | 51 | 34 | 17 |
| 7 | 42 | 28 | 14 |
| 8 | 39 | 26 | 13 |
| 9 | 33 | 22 | 11 |
| 10 | 30 | 20 | 10 |
| 11~20 | 15 | 10 | 5 |
| 21~50 | 6 | 4 | 2 |
| 51 AND LOWER | 3 | 2 | 1 |

FIG.10

◇LEVEL CHANGE RULES

LEVEL1  GA1001

| RANKING | SCORE | SHOP NAME | | AFTER THE LEVEL CHANGE |
|---|---|---|---|---|
| 1 | 1250 | S-GA100101 | ⇒ | LEVEL1 |
| 2 | 1150 | S-GA100102 | ⇒ | LEVEL2 |
| 3 | 1050 | S-GA100103 | ⇒ | LEVEL2 |
| 4 | 950 | S-GA100104 | ⇒ | LEVEL2 |
| 5 | 850 | S-GA100105 | ⇒ | LEVEL2 |
| 6 | 800 | S-GA100106 | ⇒ | LEVEL2 |
| 7 | 750 | S-GA100107 | ⇒ | LEVEL2 |
| 8 | 700 | S-GA100108 | ⇒ | LEVEL3 |
| 9 | 650 | S-GA100109 | ⇒ | LEVEL3 |
| 10 | 600 | S-GA100110 | ⇒ | LEVEL3 |
| 11 | 550 | S-GA100111 | ⇒ | LEVEL3 |

LEVEL2  GA2001~GA2002

| RANKING | SCORE | SHOP NAME | | AFTER THE LEVEL CHANGE |
|---|---|---|---|---|
| 1 | 1000 | S-GA200101 | ⇒ | LEVEL1 |
| 2 | 900 | S-GA200102 | ⇒ | LEVEL1 |
| 3 | 800 | S-GA200103 | ⇒ | LEVEL1 |
| 4 | 700 | S-GA200104 | ⇒ | LEVEL3 |
| 5 | 650 | S-GA200105 | ⇒ | LEVEL3 |
| 6 | 600 | S-GA200106 | ⇒ | LEVEL3 |
| 7 | 550 | S-GA200107 | ⇒ | LEVEL3 |
| 8 | 500 | S-GA200108 | ⇒ | LEVEL4 |
| 9 | 450 | S-GA200109 | ⇒ | LEVEL4 |
| 10 | 400 | S-GA200110 | ⇒ | LEVEL4 |
| 11 | 350 | S-GA200111 | ⇒ | LEVEL4 |

LEVEL3  GA3001~GA3004

| RANKING | SCORE | SHOP NAME | | AFTER THE LEVEL CHANGE |
|---|---|---|---|---|
| 1 | 900 | S-GA300101 | ⇒ | LEVEL1 |
| 2 | 800 | S-GA300102 | ⇒ | LEVEL2 |
| 3 | 700 | S-GA300103 | ⇒ | LEVEL2 |
| 4 | 650 | S-GA300104 | ⇒ | LEVEL4 |
| 5 | 600 | S-GA300105 | ⇒ | LEVEL4 |
| 6 | 550 | S-GA300106 | ⇒ | LEVEL4 |
| 7 | 500 | S-GA300107 | ⇒ | LEVEL4 |
| 8 | 450 | S-GA300108 | ⇒ | LEVEL5 |
| 9 | 400 | S-GA300109 | ⇒ | LEVEL5 |
| 10 | 350 | S-GA300110 | ⇒ | LEVEL5 |
| 11 | 300 | S-GA300111 | ⇒ | LEVEL5 |

LEVEL4  GA4001~GA4008

| RANKING | SCORE | SHOP NAME | | AFTER THE LEVEL CHANGE |
|---|---|---|---|---|
| 1 | 700 | S-GA400101 | ⇒ | LEVEL2 |
| 2 | 650 | S-GA400102 | ⇒ | LEVEL3 |
| 3 | 600 | S-GA400103 | ⇒ | LEVEL3 |
| 4 | 500 | S-GA400104 | ⇒ | LEVEL5 |
| 5 | 400 | S-GA400105 | ⇒ | LEVEL5 |
| 6 | 300 | S-GA400106 | ⇒ | LEVEL5 |
| 7 | 200 | S-GA400107 | ⇒ | LEVEL5 |
| 8 | 150 | S-GA400108 | ⇒ | LEVEL6 |
| 9 | 100 | S-GA400109 | ⇒ | LEVEL6 |
| 10 | 50 | S-GA400110 | ⇒ | LEVEL6 |
| 11 | 30 | S-GA400111 | ⇒ | LEVEL6 |

LEVEL5  GA5001~GA5016

| RANKING | SCORE | SHOP NAME | | AFTER THE LEVEL CHANGE |
|---|---|---|---|---|
| 1 | 500 | S-GA500101 | ⇒ | LEVEL3 |
| 2 | 460 | S-GA500102 | ⇒ | LEVEL4 |
| 3 | 420 | S-GA500103 | ⇒ | LEVEL4 |
| 4 | 360 | S-GA500104 | ⇒ | LEVEL6 |
| 5 | 300 | S-GA500105 | ⇒ | LEVEL6 |
| 6 | 240 | S-GA500106 | ⇒ | LEVEL6 |
| 7 | 180 | S-GA500107 | ⇒ | LEVEL6 |
| 8 | 120 | S-GA500108 | ⇒ | LEVEL7 |
| 9 | 60 | S-GA500109 | ⇒ | LEVEL7 |
| 10 | 50 | S-GA500110 | ⇒ | LEVEL7 |
| 11 | 40 | S-GA500111 | ⇒ | LEVEL7 |

LEVEL6  GA6001~GA6032

| RANKING | SCORE | SHOP NAME | | AFTER THE LEVEL CHANGE |
|---|---|---|---|---|
| 1 | 300 | S-GA600101 | ⇒ | LEVEL4 |
| 2 | 270 | S-GA600102 | ⇒ | LEVEL5 |
| 3 | 240 | S-GA600103 | ⇒ | LEVEL5 |
| 4 | 210 | S-GA600104 | ⇒ | LEVEL6 |
| 5 | 180 | S-GA600105 | ⇒ | LEVEL6 |
| 6 | 140 | S-GA600106 | ⇒ | LEVEL6 |
| 7 | 100 | S-GA600107 | ⇒ | LEVEL6 |
| 8 | 60 | S-GA600108 | ⇒ | LEVEL7 |
| 9 | 20 | S-GA600109 | ⇒ | LEVEL7 |
| 10 | 5 | S-GA600110 | ⇒ | LEVEL7 |
| 11 | 0 | S-GA600111 | ⇒ | LEVEL7 |

LEVEL7  GA7001~GA7064

| RANKING | SCORE | SHOP NAME | | AFTER THE LEVEL CHANGE |
|---|---|---|---|---|
| 1 | 100 | S-GA700101 | ⇒ | LEVEL5 |
| 2 | 90 | S-GA700102 | ⇒ | LEVEL6 |
| 3 | 80 | S-GA700103 | ⇒ | LEVEL6 |
| 4 | 70 | S-GA700104 | ⇒ | LEVEL7 |
| 5 | 55 | S-GA700105 | ⇒ | LEVEL7 |
| 6 | 40 | S-GA700106 | ⇒ | LEVEL7 |
| 7 | 25 | S-GA700107 | ⇒ | LEVEL7 |
| 8 | 10 | S-GA700108 | ⇒ | LEVEL7 |
| 9 | 0 | S-GA700109 | ⇒ | LEVEL7 |
| 10 | 0 | S-GA700110 | ⇒ | LEVEL7 |
| 11 | 0 | S-GA700111 | ⇒ | LEVEL7 |

FIG.11

◇ EXCEPTIONAL CASES IN THE LEVEL CHANGE RULES
  <E.G. WHEN THE NUMBER OF SHOPS IS 1,000.>

LEVEL7  GA7001~GA7027

| RANKING | SCORE | SHOP NAME | AFTER THE LEVEL CHANGE |
|---|---|---|---|
| 1 | 100 | S-GA700101 | ⇒ LEVEL5 |
| 2 | 90 | S-GA700102 | ⇒ LEVEL6 |
| 3 | 80 | S-GA700103 | ⇒ LEVEL6 |
| 4 | 70 | S-GA700104 | ⇒ LEVEL7 |
| 5 | 55 | S-GA700105 | ⇒ LEVEL7 |
| 6 | 40 | S-GA700106 | ⇒ LEVEL7 |
| 7 | 25 | S-GA700107 | ⇒ LEVEL7 |
| 8 | 10 | S-GA700108 | ⇒ LEVEL7 |
| 9 | 0 | S-GA700109 | ⇒ LEVEL7 |
| 10 | 0 | S-GA700110 | ⇒ LEVEL7 |
| 11 | 0 | S-GA700111 | ⇒ LEVEL7 |

28 SHOPS MOVE FROM LEVEL 7 TO LEVEL 5
56 SHOPS MOVE FROM LEVEL 7 TO LEVEL 6

LEVEL7  GA7028

| RANKING | SCORE | SHOP NAME | AFTER THE LEVEL CHANGE |
|---|---|---|---|
| 1 | 100 | S-GA702801 | ⇒ LEVEL5 |
| 2 | 90 | S-GA702802 | ⇒ LEVEL6 |
| 3 | 80 | S-GA702803 | ⇒ LEVEL6 |
| 4 | 70 | S-GA702804 | ⇒ LEVEL7 |
| 5 | 55 | S-GA702805 | ⇒ LEVEL7 |
| 6 | 40 | S-GA702806 | ⇒ LEVEL7 |
| 7 | 25 | S-GA702807 | ⇒ LEVEL7 |
| 8 | 10 | S-GA702808 | ⇒ LEVEL7 |
| 9 | 0 | S-GA702809 | ⇒ LEVEL7 |
| 10 | 0 | S-GA702810 | ⇒ LEVEL7 |
| 11 | – | – | LEVEL7 |

LEVEL6  GA6001~GA6014

| RANKING | SCORE | SHOP NAME | AFTER THE LEVEL CHANGE |
|---|---|---|---|
| 1 | 300 | S-GA600101 | ⇒ LEVEL4 |
| 2 | 270 | S-GA600102 | ⇒ LEVEL5 |
| 3 | 240 | S-GA600103 | ⇒ LEVEL5 |
| 4 | 210 | S-GA600104 | ⇒ LEVEL6 |
| 5 | 180 | S-GA600105 | ⇒ LEVEL6 |
| 6 | 140 | S-GA600106 | ⇒ LEVEL6 |
| 7 | 100 | S-GA600107 | ⇒ LEVEL6 |
| 8 | 60 | S-GA600108 | ⇒ LEVEL7 |
| 9 | 20 | S-GA600109 | ⇒ LEVEL7 |
| 10 | 5 | S-GA600110 | ⇒ LEVEL7 |
| 11 | 0 | S-GA600111 | ⇒ LEVEL7 |

56 SHOPS MOVE FROM LEVEL 6 TO LEVEL 7

LEVEL6  GA6015~GA6032

| RANKING | SCORE | SHOP NAME | AFTER THE LEVEL CHANGE |
|---|---|---|---|
| 1 | 300 | S-GA601501 | ⇒ LEVEL4 |
| 2 | 270 | S-GA601502 | ⇒ LEVEL5 |
| 3 | 240 | S-GA601503 | ⇒ LEVEL5 |
| 4 | 210 | S-GA601504 | ⇒ LEVEL6 |
| 5 | 180 | S-GA601505 | ⇒ LEVEL6 |
| 6 | 140 | S-GA601506 | ⇒ LEVEL6 |
| 7 | 100 | S-GA601507 | ⇒ LEVEL6 |
| 8 | 60 | S-GA601508 | ⇒ LEVEL6 |
| 9 | 20 | S-GA601509 | ⇒ LEVEL6 |
| 10 | 5 | S-GA601510 | ⇒ LEVEL6 |
| 11 | 0 | S-GA601511 | ⇒ LEVEL6 |

72 SHOPS REMAIN IN LEVEL 6

LEVEL5  GA5001~GA5007

| RANKING | SCORE | SHOP NAME | AFTER THE LEVEL CHANGE |
|---|---|---|---|
| 1 | 500 | S-GA500101 | ⇒ LEVEL3 |
| 2 | 460 | S-GA500102 | ⇒ LEVEL4 |
| 3 | 420 | S-GA500103 | ⇒ LEVEL4 |
| 4 | 360 | S-GA500104 | ⇒ LEVEL6 |
| 5 | 300 | S-GA500105 | ⇒ LEVEL6 |
| 6 | 240 | S-GA500106 | ⇒ LEVEL6 |
| 7 | 180 | S-GA500107 | ⇒ LEVEL6 |
| 8 | 120 | S-GA500108 | ⇒ LEVEL7 |
| 9 | 60 | S-GA500109 | ⇒ LEVEL7 |
| 10 | 50 | S-GA500110 | ⇒ LEVEL7 |
| 11 | 40 | S-GA500111 | ⇒ LEVEL7 |

28 SHOPS MOVE FROM LEVEL 5 TO LEVEL 7

LEVEL5  GA5008~GA5016

| RANKING | SCORE | SHOP NAME | AFTER THE LEVEL CHANGE |
|---|---|---|---|
| 1 | 500 | S-GA500801 | ⇒ LEVEL3 |
| 2 | 460 | S-GA500802 | ⇒ LEVEL4 |
| 3 | 420 | S-GA500803 | ⇒ LEVEL4 |
| 4 | 360 | S-GA500804 | ⇒ LEVEL5 |
| 5 | 300 | S-GA500805 | ⇒ LEVEL5 |
| 6 | 240 | S-GA500806 | ⇒ LEVEL5 |
| 7 | 180 | S-GA500807 | ⇒ LEVEL5 |
| 8 | 120 | S-GA500808 | ⇒ LEVEL6 |
| 9 | 60 | S-GA500809 | ⇒ LEVEL6 |
| 10 | 50 | S-GA500810 | ⇒ LEVEL6 |
| 11 | 40 | S-GA500811 | ⇒ LEVEL6 |

36 SHOPS REMAIN IN LEVEL 5

RANKING DETERMINATION SYSTEM AND PROGRAM, AND RECORDING MEDIUM STORING THE PROGRAM

CROSS-REFERENCE TO RELATED APPLICATION

This application is a National Stage entry of International Application No. PCT/JP2006/323472, filed Nov. 24, 2006, the entire specification claims and drawings of which are incorporated herewith by reference.

BACKGROUND OF THE INVENTION

1. Field of the Invention

The present invention relates to a system and program for determining the ranking of network game players, and a recording medium which stores the program. The system includes a server and game machines which communicate with the server via a network, the server being programmed to determine the ranking of respective teams of game players in accordance with the players' game results sent from the game machines.

2. Description of the Related Art

Many computer-controlled game machines include a feature for ranking players based on their game results. Players who have gained high scores are invited to enter their names or nicknames at the end of the game so that their names or nicknames are listed with their scores in the ranking chart. The ranking feature appeals to players because it makes their techniques known to other players of the same game.

With the advanced network communication technology in recent years, a large number of people from across a country or from all over the world can participate in the same game and compete against each other, their game results being collected in a server run by a game manufacturer or the like via the network for ranking purposes. One problem with this system is that higher ranking positions of a popular game with many participants are always occupied by the same skilled players, and beginners can hardly get their scores and names listed in the ranking chart, because of which the less experienced are less interested in the ranking system.

Improvements have been proposed to address the issue; for example, Japanese Patent Application Laid-Open No. 2000-233069 describes a system in which, while latest game results are recorded in a ranking chart irrespective of the scores, ranking data are basically deleted when they get old, except for those which are ranked above a preset level, or, ranking entries are deleted from the lowest position except for latest game results. Japanese Patent Application Laid-Open No. 2003-135854 teaches grouping players in accordance with their skills and setting different levels of difficulty for each group, the players being ranked within respective groups.

With the ranking system disclosed in Japanese Patent Application Laid-Open No. 2000-233069, even players who have obtained low scores can get their results and names listed on the ranking chart, but only temporarily, and the problem that skilled players always occupy the ranking chart is not resolved. Another problem is that, if a player's latest score is far lower than others in the ranking, the significance of ranking would be lost, because the player cannot recognize at which level his skills actually are among all the players who have played the same game, which is initially the idea of ranking.

With the ranking system disclosed in Japanese Patent Application Laid-Open No. 2003-135854, if the number of grouped players increases to a large number, the same problem that higher positions in each group are occupied by the same players will arise. Another problem is that participants play games with different levels of difficulty set by the server in accordance with the players' skills, i.e., strictly speaking, the system is not a ranking system of players who have played the same game.

SUMMARY OF THE INVENTION

In view of the foregoing, it is an object of the present invention to provide a ranking determination system and program which ensure that all the game players are ranking-conscious when playing the game and wish to play it again, even if the game is a widely popular game played by a large number of people.

To achieve the above object, the first aspect of the present invention provides a ranking determination system including a server connected to a communication network and a game machine which can transmit and receive information to and from the server through the communication network, wherein the game machine sends game results of players to the server, and the server determines a ranking of respective teams of the players who have played the game based on the game results. The server includes storage means for storing a ranking chart with a plurality of levels, each level containing one or more groups of a preset number of teams, each team being allocated a region for storing one or more sets of player information including a result of a game played by a player and information of the player's team. The server further includes: game result collecting means for acquiring the game result from the game machine with which the game has been played; player ranking determination means for comparing the game result collected by the game result collecting means with existing game results of other players within the same group containing the team of the player who has played the game to determine an in-group ranking of the player; team ranking renewing means for calculating an in-group ranking of the team of the player based on the player's ranking determined by the player ranking determination means and for renewing the in-group ranking of the team; and ranking chart renewing means for renewing the in-group ranking based on the in-group ranking of the team renewed by the team ranking renewing means.

The second aspect of the present invention provides a ranking determination system including a server connected to a communication network and a game machine which can transmit and receive information to and from the server through the communication network, wherein the game machine sends game results of players to the server, and the server determines a ranking of respective teams of the players who have played the game based on the game results. The server includes storage means for storing a ranking chart with a plurality of levels, each level containing one or more groups of a preset number of teams, each team being allocated a region for storing one or more sets of player information including a result of a game played by a player and information of the player's team. The server further includes: game result collecting means for acquiring the game result from the game machine with which the game has been played; player ranking determination means for comparing the game result collected by the game result collecting means with existing game results of other players within the same group containing the team of the player who has played the game to determine an in-group ranking of the player; team ranking renewing means for calculating an in-group ranking of the team of the player based on the player's ranking determined by the player ranking determination means and for renewing the in-group ranking of the team; ranking chart renewing means for renewing the in-group ranking based on the in-group ranking of the team renewed by the team ranking renewing means; team level determination means for determining at which level each team should be placed based on the ranking of the team being renewed at a preset time interval; and team group determination means for determining to which group each team should belong at the level determined by the team level determination means.

In the first or second aspect of the present invention, the number of groups at each level of the ranking chart may be the same throughout all the levels, or increased as the level goes down. For example, the top level may have one group, while the second, third, . . . and Nth level may have (n−1)th power of 2 groups, respectively. The number of teams belonging to one group may be suitably set such that their in-group rankings can be displayed in a list.

The third aspect of the present invention relates to the ranking determination system as set forth in the first or second aspect, wherein the team ranking renewing means includes: team point determination means for determining how many points should be given to the team of the player based on the player's ranking determined by the player ranking determination means; team point renewing means for adding the points determined by the team point determination means to the points currently owned by the team and for renewing and storing the new points as the team's current points; and team ranking determination means for comparing the team's current points renewed by the team point renewing means with current points of other teams in the group to which the team belongs to determine the team's ranking within that group.

The fourth aspect of the present invention relates to the ranking determination system as set forth in the second aspect, wherein the team ranking renewing means includes: team point determination means for determining how many points should be given to the team of the player who has played the game based on the player's ranking determined by the player ranking determination means; team point renewing means for adding the points determined by the team point determination means to the points currently owned by the team and for renewing and storing the new points as the team's current points; team ranking determination means for comparing the team's current points renewed by the team point renewing means with the current points of other teams in the group to which the team belongs to determine the team's ranking within that group; and ranking chart resetting means for resetting all the teams' points and renewing the ranking chart after the team group determination means has decided to which group each team should belong.

The fifth aspect of the present invention provides a ranking determination system including a server connected to a communication network and a game machine which can transmit and receive information to and from the server through the communication network, wherein the game machine sends game results of players to the server, and the server determines the ranking of respective teams of the players who have played the game based on the game results. The server includes: storage means for storing a ranking chart with a plurality of levels, each level containing one or more groups of a preset number of players, each group being allocated a region for storing one or more sets of player information including a result of a game played by a player and information of the player's group. The server further includes: game result collecting means for acquiring the game result from a game machine with which the game has been played; player ranking determination means for comparing the game result collected by the game result collecting means with existing game results of other players within the group of the player who has played the game to determine an in-group ranking of the player; ranking chart renewing means for renewing the in-group ranking based on the player's ranking which is determined by the player ranking determination means; player level determination means for determining at which level each player should be placed based on the player ranking renewed at a preset time interval; and player group determination means for determining to which group each player should belong at the level determined by the player level determination means.

The sixth aspect of the present invention provides a ranking determination program, which enables a computer to function as a server which determines a ranking of respective teams of game players based on game results sent from a game machine which can transmit and receive information to and from the server through a communication network. The computer is allowed to function as storage means for storing a ranking chart with a plurality of levels, each level containing one or more groups of a preset number of said teams, each team being allocated a region for storing one or more sets of player information including a result of a game played by a player and information of the player's team; game result collecting means for acquiring the game result from the game machine with which the game has been played; player ranking determination means for comparing the game result collected by the game result collecting means with existing game results of other players within the same group containing the team of the player who has played the game to determine an in-group ranking of the player; team ranking renewing means for calculating an in-group ranking of the team of the player based on the player's ranking determined by the player ranking determination means and for renewing the in-group ranking of the team; and ranking chart renewing means for renewing the in-group ranking based on the in-group ranking of the team renewed by the team ranking renewing means.

The seventh aspect of the present invention provides a ranking determination program, which enables a computer to function as a server which determines a ranking of respective teams of game players based on game results sent from a game machine which can transmit and receive information to and from the server through a communication network. The computer is allowed to function as storage means for storing a ranking chart with a plurality of levels, each level containing one or more groups of a preset number of the teams, each team being allocated a region for storing one or more sets of player information including a result of a game played by a player and information of the player's team; game result collecting means for acquiring the game result from the game machine with which the game has been played; player ranking determination means for comparing the game result collected by the game result collecting means with existing game results of other players within the same group containing the team of the player who has played the game to determine an in-group ranking of the player; team ranking renewing means for calculating an in-group ranking of the team of the player based on the player's ranking determined by the player ranking determination means and for renewing the in-group ranking of the team; ranking chart renewing means for renewing the in-group ranking based on the in-group ranking of the team renewed by the team ranking renewing means; team level determination means for determining at which level each team should be placed based on the ranking of the team being renewed at a preset time interval; and team group determination means for determining to which group each team should belong at the level determined by the team level determination means.

The eighth aspect of the present invention relates to the ranking determination program as set forth in the sixth or seventh aspect, wherein the computer is allowed to function as team point determination means for determining how many points should be given to the team of the player who has played the game based on the player's ranking determined by the player ranking determination means; team point renewing means for adding the points determined by the team point determination means to the points currently owned by the team and for renewing and storing the new points as the team's current points; and team ranking determination means for comparing the team's current points renewed by the team point renewing means with the current points of other teams in the group to which the team belongs to determine the team's ranking within that group.

The ninth of the present invention relates to the ranking determination program as set forth in the seventh aspect, wherein the computer is allowed to function as team point determination means for determining how many points should be given to the team of the player who has played the game based on the player's ranking determined by the player ranking determination means; team point renewing means for adding the points determined by the team point determination means to the points currently owned by the team and for renewing and storing the new points as the team's current points; team ranking determination means for comparing the team's current points renewed by the team point renewing means with the current points of other teams in the group to which the team belongs to determine the team's ranking within that group; and ranking chart resetting means for resetting all the teams' points and renewing the ranking chart after the team group determination means has decided to which group each team should belong.

The tenth aspect of the present invention provides a ranking determination program, which enables a computer to function as a server which determines a ranking of game players based on game results sent from a game machine which can transmit and receive information to and from the server through a communication network. The computer is allowed to function as storage means for storing a ranking chart with a plurality of levels, each level containing one or more groups of a preset number of players, each group being allocated a region for storing one or more sets of player information including a result of a game played by a player and information of the player's group; game result collecting means for acquiring the game result from the game machine with which the game has been played; player ranking determination means for comparing the game result collected by the game result collecting means with existing game results of other players within the group of the player who has played the game to determine an in-group ranking of the player; ranking chart renewing means for renewing the in-group ranking based on the player's ranking which is determined by the player ranking determination means; player level determination means for determining at which level each player should be placed based on the player ranking which is renewed at a preset time interval; and player group determination means for determining to which group each player should belong at the level determined by the player level determination means.

The eleventh aspect of the present invention provides a machine-readable recording medium, which stores the ranking determination program as set forth in the sixth to tenth aspects.

According to one embodiment of the present invention configured as described above, the ranking chart has a hierarchy of several levels, each level containing one or more groups of a preset number of teams, each team being allocated a region for storing one or more sets of player information including players' game results and player's team information. The teams are ranked based on the game results of the players. The number of teams belonging to each group is a predetermined fixed number without increasing and decreasing. With an appropriately set number of teams, the rankings of all the teams can be viewed easily. Thus, every time a player checks the ranking chart at the end of a game, he can see the in-group ranking of his team and realize that his game results have direct bearing on the ranking. The player is therefore always interested in the ranking system and feels encouraged to play the game again.

The position of the player's team among all entrant teams can be readily known by checking to which group the team belongs and at which level of the ranking chart that group is placed.

The level of challenge is not varied for different levels of groups. The identity of game settings and conditions is therefore strictly preserved for all game players.

In addition, according to another embodiment of the present invention, teams move up and down in the hierarchy based on their in-group rankings which are renewed at a preset time interval. That is, the teams which have taken upper positions within the irrespective groups during the preset period of time are moved to an upper level, while the teams in lower positions in the in-group rankings are moved to a lower level. This feature raises players' morale because they would like to obtain higher results in a next game to get their team ranked to a higher level. The players are thus encouraged to play the game again and kept interested in the ranking system.

In a yet another embodiment of the present invention, each of the several levels of the hierarchical ranking chart contains one or more groups of a preset number of players, and each group is allocated a region for storing one or more sets of player information including game results of the players and their group information. The players are ranked based on the game results, and therefore they can check their rankings in the group from the ranking chart, and are kept interested in the ranking system.

BRIEF DESCRIPTION OF THE DRAWINGS

FIG. 3 shows the contents of the player information database of FIG. 2;

FIG. 4 shows the contents of the shop information databases of FIG. 2;

FIG. 5 shows the group ranking chart of FIG. 2;

FIG. 6 shows the in-group shop ranking charts of FIG. 2;

FIG. 7 shows the in-group player ranking chart of FIG. 2;

FIG. 8 shows the score table of FIG. 2;

FIG. 10 shows charts for explaining the algorithm of changing the levels of shops according to one embodiment of the present invention;

FIG. 11 shows charts for explaining exceptional cases in the algorithm of changing the levels of shops according to one embodiment of the present invention;

DETAILED DESCRIPTION OF THE PREFERRED EMBODIMENTS

Preferred embodiments of the present invention will be hereinafter described in detail, by way of example, with reference to the drawings. The following embodiment is intended for use in a model in which customers or players play various computer-controlled games in game machines which are installed in shops, and the shops are ranked as teams of players based on the game results. In this example, about a thousand shops from across the country have entered the competition, several to several tens of players belonging to each shop. Each player has previously selected a shop to which he/she belongs, and registered player information in a game machine in the shop or a shop server (not shown). The game machine or game server in the shop is allocated a region for storing player information of all the players which belong to the shop, including results of games the players have played and information on the shop. The game machine or game server in the shop uploads the player information provided from players to a server 100, which in turn generates and sends corresponding identification numbers to the game machine or server in the shop to be given to the players. The identification numbers received from the server are recorded on an external recording medium such as a magnetic card or an IC card which is detachable from the game machine or game server in the shop.

Figure 1:
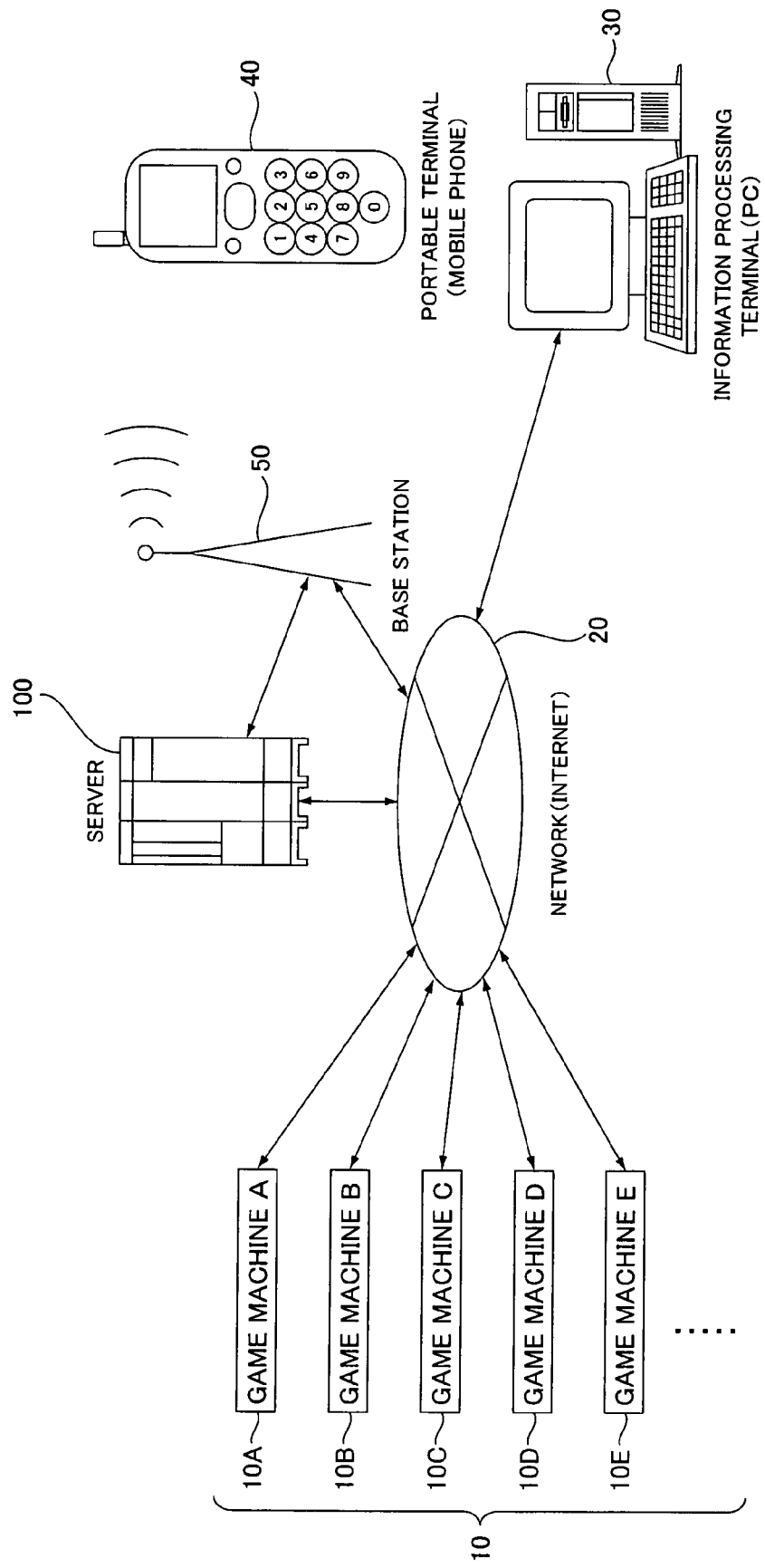
FIG. 1 is a network connection diagram according to one embodiment of the present invention.

FIG. 1 is a network connection diagram illustrating one example of a network configuration according to the present embodiment. As shown, the game machine 10 or game machines 10A, 10B, 10C, 10D, 11E . . . , installed in shops all over the country are connected to the server 100 through a communication network 20 such as the Internet. One shop includes at least one game machine 10, but may include several game machines. To start a game, the player enters his/her identification number in the game machine 10, or the game machine 10 reads out the identification number from an external recording medium such as a magnetic card or an IC card, which is sent to the server 100, to obtain a signal from the server 100 giving permission to start the game. Every time one game ends, the game machine 10 uploads the game result to the server 100 through the network 20, and the shop to which the player belongs is ranked based on collected game results. The ranking information produced in the server 100 is made public in the server 100 to those who own predetermined ID information and can be viewed from an information processing terminal 30 such as a PC through the network 20, or from a portable terminal 40 such as a mobile phone via a wireless base station 50 and the network 20.

Figure 2:
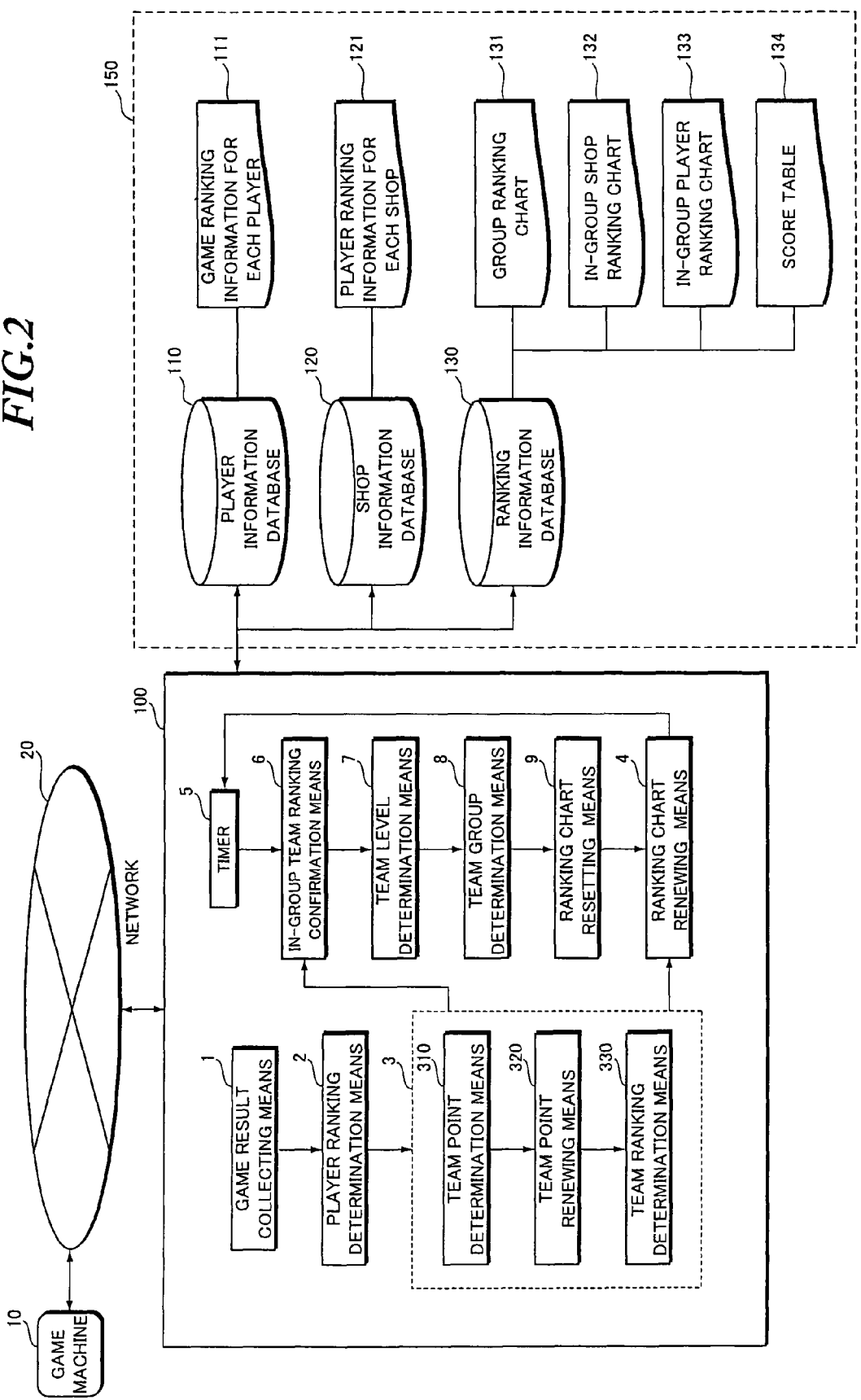
FIG. 2 is a block diagram illustrating the internal configuration of a server and databases connected to the server according to one embodiment of the present invention.

FIG. 2 is a block diagram illustrating the internal configuration of the server 100 and various databases (storage means 150) connected to the server 100.

The server 100 includes game result collecting means 1, player ranking determination means 2, team (shop) ranking renewing means 3, and ranking chart renewing means 4: The game result collecting means 1 acquires a game result uploaded from the game machine 10 via the network 20 after a player has played a game. The player ranking determination means 2 compares the result collected by the game result collecting means with the game results of other players in a group to which the shop, of which he/she is a member, belongs to, and decides the player's ranking position within the group. The team (shop) ranking renewing means 3 calculates and decides the ranking of the shop to which the player belongs within the group based on the thus determined player's ranking, and renews the ranking of all the shops in the group. The ranking chart renewing means 4 renews in-group shop ranking charts 132 which will be described later and other information based on the shop ranking renewed by the shop ranking renewing means 3. The team (shop) ranking renewing means 3 includes team (shop) point determination means 310, team (shop) point renewing means 320, and team (shop) ranking determination means 330: The team point determination means 310 decides how many points should be given to the shop to which the player belongs based on the player ranking which has been determined by the player ranking determination means 2. The point renewing means 320 adds the newly given points to the current points of the shop and renews and stores the new points as the shop's current points. The team (shop) ranking determination means 330 determines the in-group ranking of all the shops of the group to which the shop belongs based on the renewed points.

The server 100 further includes a timer 5 for counting a predetermined period of time (e.g. 1 week), in-group team (shop) ranking confirmation means 6, team (shop) level determination means 7, team (shop) group determination means 8, and ranking chart resetting means 9: The in-group team (shop) ranking confirmation means 6 confirms the ranking of all the shops in the group, which has been determined by the shop ranking renewing means 3, after the timer 5 has counted a preset time. The team (shop) level determination means 7 decides, based on the confirmed ranking, at which level each shop should be placed in the group ranking chart 131 which will be described later. The team (shop) group determination means 8 decides to which group each shop should belong at the determined level. The ranking chart resetting means 9 resets the current points of all the shops when all of them have been placed to appropriate groups, to renew the in-group shop ranking chart 132 and others.

The server 100 includes, or is connected to, various databases stored in the storage means 150. The player information database 110 accumulates the identification numbers of players who have registered in this ranking system, their names or nicknames, registration numbers of shops they belong to, personal results of various games, and other player information, as shown in FIG. 3. For ease of explanation, the illustrated example shows only three kinds of games A, B, and C, but there may be any number of kinds of games. The game results of each type of game include three items: The number of times that the player has played the game previously; the personal ranking of the player in the group to which he/she belongs, i.e., the position in the ranking chart which will be described later; and the total sum of the points which the player has contributed to the shop, i.e., the points the shop has gained owing to the player's game results. Ranking information 111 is created as required, which is for example the ranking of one player in one type of game among all the participants, based on this player information.

The shop information database 120 accumulates the registration numbers of the shops which have registered in this ranking system, shop names, locations, shop scores of various games, the numbers of member players, the identification numbers of the member players, and other shop information, as shown in FIG. 4. The results of each type of game include four items: The total sum of the number of times that all the member players of the shop have played; the total sum of the points given to the shop based on the game results of the member players; the shop's ranking in the group to which the shop belongs, i.e., the position in the ranking chart which will be described later; and the reference No. of the group of which the shop is a member (The groups will be described later in more detail). Ranking information 121 is created as required, which is for example contribution rankings of member players for each shop, based on this shop information.

The ranking information database 130 accumulates the group ranking charts 131 of various types of games, in-group shop ranking charts 132, in-group player ranking charts 133, and score tables 134.

The group ranking chart 131 has a hierarchical structure consisting of seven levels of groups for each type of game, as shown in FIG. 5. The reference number GA1001 at each level denotes one group in that level, each group having eleven member shops.

The highest Level 1 has one group, Level 2 has two groups, Level 3 has four groups, and likewise, the lower the level is, the twice larger the number of groups becomes. This way, the number of levels need not be increased unnecessarily even if the number of registered shops increases. In this example, Level 4 has eight groups, Level 5 has sixteen groups, Level 6 has thirty-two groups, and Level 7 has sixty-four groups. Thus one ranking chart with seven levels has a total of 127 groups and can accommodate 1,397 shops. Each of the shops is placed in one of these groups, and competes against other ten shops within that group.

FIG. 6 shows in-group shop ranking charts 132, which are the rankings of the shops in respective groups of FIG. 5. Each group has eleven shops. As the member players of each shop play games, the shop's scores change in accordance with their results, and every time there is a change in the order within the group, the ranking chart is renewed.

FIG. 7 shows an in-group player ranking chart 133, which shows the order of all the players which belong to the eleven shops in one group. FIG. 8 shows a score table 134 for respective types of games. Using these in-group player ranking chart 133 and score table 134, the latest results of players are converted into points in accordance with the results, which are to be given to the shops they belong to. More specifically, a player's ranking within the group, which is known from the scores of the latest game results and the in-group player ranking chart 133, is matched up with the score table 134 to decide how many points should be given to the shop. If, for example, a player has played Game A and was the third in the ranking within the group, the shop to which the player belongs will be given 99 points, based on the score table 134.

The score table 134 is set so that the scores increase when the top player of a game is replaced, i.e., when the highest score of a game is renewed. This system enables players who have participated a fewer number of times to obtain high scores for their shops when they take higher places in the ranking.

Figure 9:
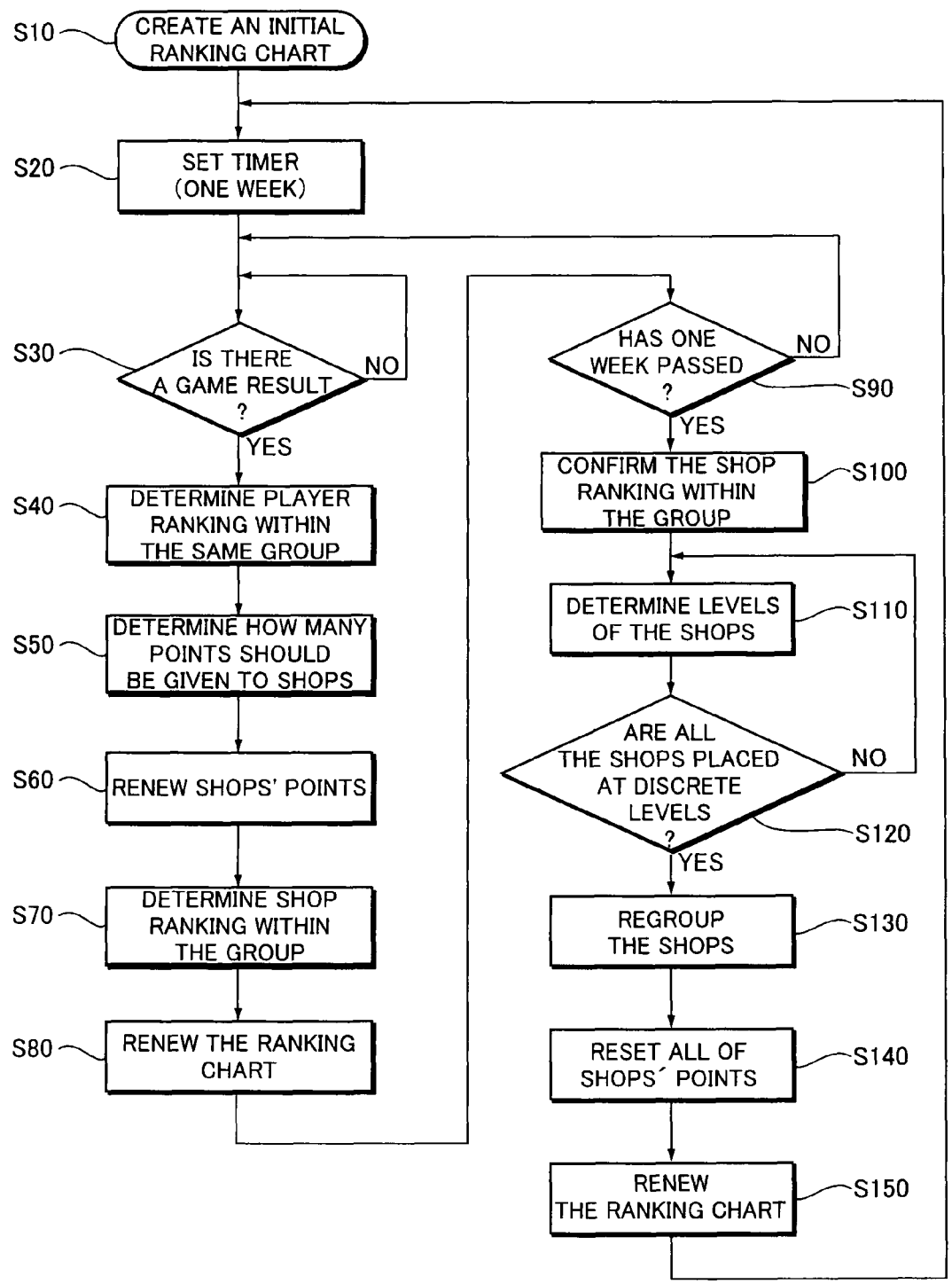
FIG. 9 is a flowchart of the process steps for renewing the ranking chart according to one embodiment of the present invention.

Next, how the ranking chart is renewed in the ranking determination system according to one embodiment of the present invention will be described with reference to FIG. 9. FIG. 9 shows the flowchart of the process steps for renewing the ranking chart.

The operator of this system first invites game shops across the country to join a preliminary game competition, and an initial ranking chart is created based on the results and stored in the storage means 150 (S10). The timer is set for a predetermined period of, for example, a week after the initial ranking chart is created (S20). When the timer is set, the server 100 checks whether or not any game results have been uploaded (S30). A game result may be uploaded every time one game ends in a game machine 10 in each shop, or, game results per day or per certain time interval may be stored in the game machine 10 or shop server and uploaded at the preset interval.

When game results are uploaded, the relevant in-group player ranking chart 133 is searched, using the player's identification number, which has been sent before the game or each game starts, and the player's ranking in the group is determined based on the game results (S40). Then, how many points should be given to the shop to which the player belongs is decided by referring to the score table 134 (S50). The points thus determined at step S50 are added to the current points of that shop, and the renewed FIG. 25 is stored as the current points (S60). The renewed score of the shop is compared with those of other shops within the same group using the in-group shop ranking chart 132 to decide the shop's ranking in the group (S70), and the in-group shop ranking chart 132 is renewed (S80). The process steps from S30 to S80 described above are repeated until one week or other timer-set period of time passes.

When one week has passed, the answer given at S90 is affirmative and the process goes to S100, where the in-group ranking chart 132 is confirmed as the one-week record. Based on this confirmed in-group shop ranking, the level of each shop is decided to create a next group ranking chart 131 (S110). The time interval set by the timer at S90 need not be one week but may be any other interval (e.g., a day). Step S100 is not absolutely necessary; reference may be made to the latest version of the in-group shop ranking chart 132 at the time point when it is recognized that the preset period of time has passed at step S90.

FIG. 10 shows the rules of the algorithm of changing the levels of the shops in accordance with the confirmed in-group shop ranking. Basically, shops which stand first are moved two levels up, and shops which take the second and the third positions are moved one level up, from the levels which have two or more levels above and three or more levels below (in this example, Level 3 and Level 4). Shops which take fourth to seventh places are moved one level down, and the eighth to eleventh shops are moved two levels down. This rule basically applies to other levels, and if there is no position for a shop in a level to be moved to according to the rule, then the shop is moved in accordance with that level's own rule.

For example, shops belonging to Level 1 cannot go further up. Therefore, the shop which stands first in Level 1 stays, exceptionally, in Level 1, and the second and the third shops are moved to Level 2, as shown in FIG. 10. Shops which take fourth to seventh places are moved one level down and the eighth to eleventh shops are moved two levels down according to the above rule.

The shop which ranks first in Level 2 cannot go two levels up, so it is moved to Level 1. The second to eleventh shops are moved in accordance with the above rule.

Shops belonging to Level 3 and Level 4 are all moved in accordance with the rule as described above.

A description will now be made on cases involving Level 5 to Level 7 with reference to FIG. 10, with a presupposition that Level 7 has full sixty-four groups.

Shops belonging to Level 5 are all moved in accordance with the rule as described above.

Shops which take first to third places in Level 6 are moved in accordance with the rule, while, because of the restriction on the number of shops which can go down to Level 7, the fourth to seventh shops remain in Level 6, and the eighth to eleventh shops (32 groups×4 shops=128 shops) are moved to Level 7.

Shops which take first to third places in Level 7 are moved in accordance with the rule, while, because it is the lowest level, the fourth to eleventh shops stay in Level 7, as an exception to the rule.

Next, the cases where Level 7 does not contain full sixty-four groups will be described with reference to FIG. 11. Shops belonging to Level 1 to Level 4 are moved around in accordance with the algorithm described above with reference to FIG. 10. Suppose that a thousand shops, for example, have registered in this system, the shops belonging to Level 5 to Level 7 are moved around as follows:

As one group consists of eleven shops, ninety groups of full eleven shops (990 shops) and one group of ten shops will be formed out of a thousand registered shops, so the total number of groups will be ninety-one. When these groups are placed in order from Level 1, Level 7 will have twenty-eight groups, with twenty-seven groups of full eleven member shops and one group of ten shops.

If the shops belonging to the groups in Level 7 are to be moved around in accordance with the algorithm explained with reference to FIG. 10, twenty-eight shops (one each from 28 groups) will be moved to Level 5, and fifty-six shops (two each from 28 groups) will be moved to Level 6. This is all what needs to be done with respect to the shops belonging to Level 7. Generally, when Level 7 has N group(s) (1≦N≦64), N shop(s) is/are moved to Level 5, and 2N shops are moved to Level 6.

A total of fifty-six shops in Level 6 need to be exchanged with the same number of shops in Level 7. As shown in FIG. 11, shops of fourteen groups in Level 6 are determined to be moved to Level 7, while the 4th to 11th shops in the remaining eighteen groups in Level 6 remain in the same level. This is all what needs to be done with respect to the shops belonging to Level 6.

Twenty-eight shops in Level 5 need to be exchanged with the same number of shops in Level 7. As shown in FIG. 11, shops of seven groups in Level 5 are determined to be moved to Level 7, while the fourth to seventh shops in the remaining nine groups in Level 5 stay in the same level, and the eighth to eleventh shops are moved to Level 6. This is all what needs to be done with respect to the shops belonging to Level 5.

Figure 12:
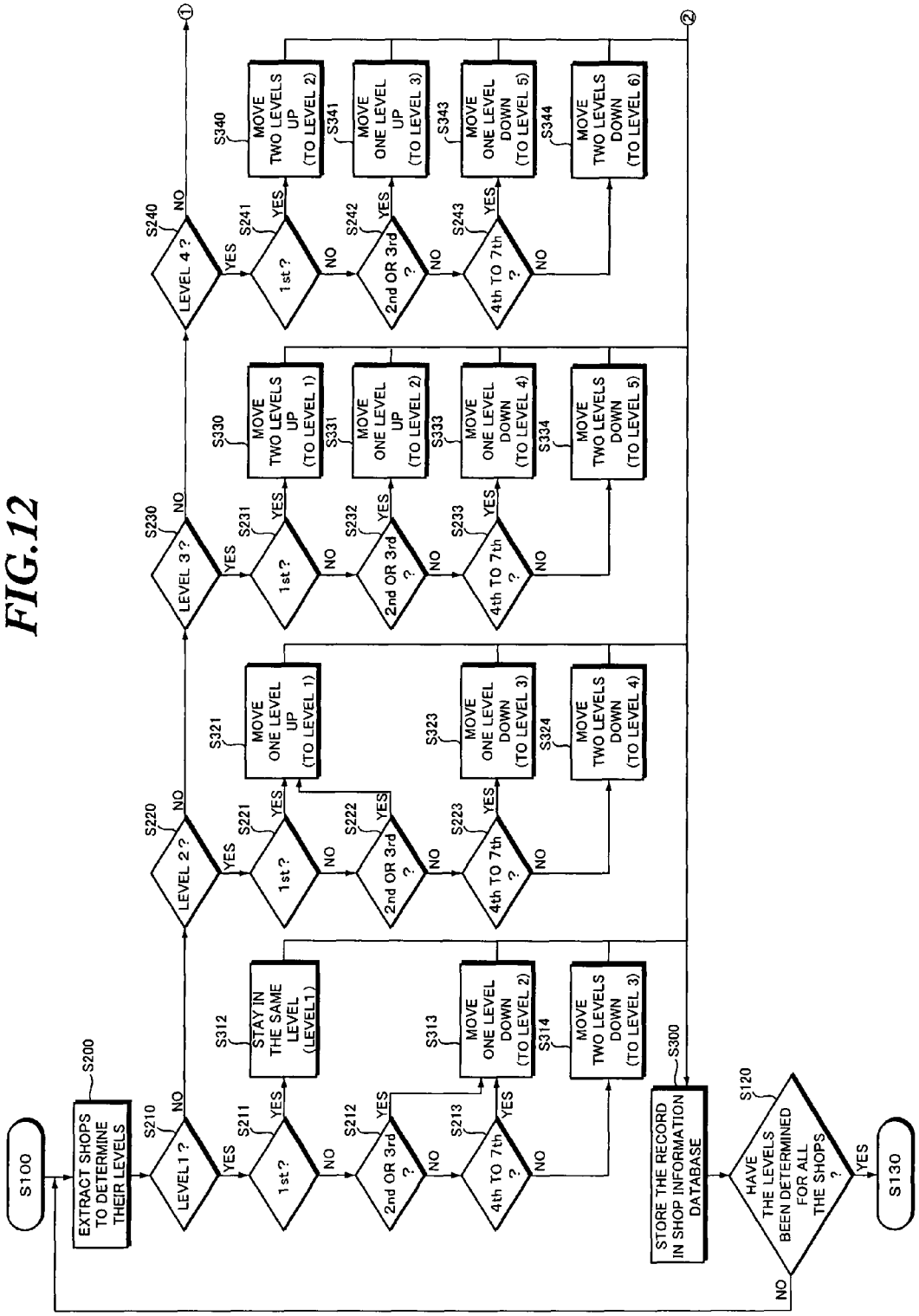
FIG. 12 shows a flowchart explaining a part of the process steps for changing the levels of shops according to one embodiment of the present invention.
Figure 13:
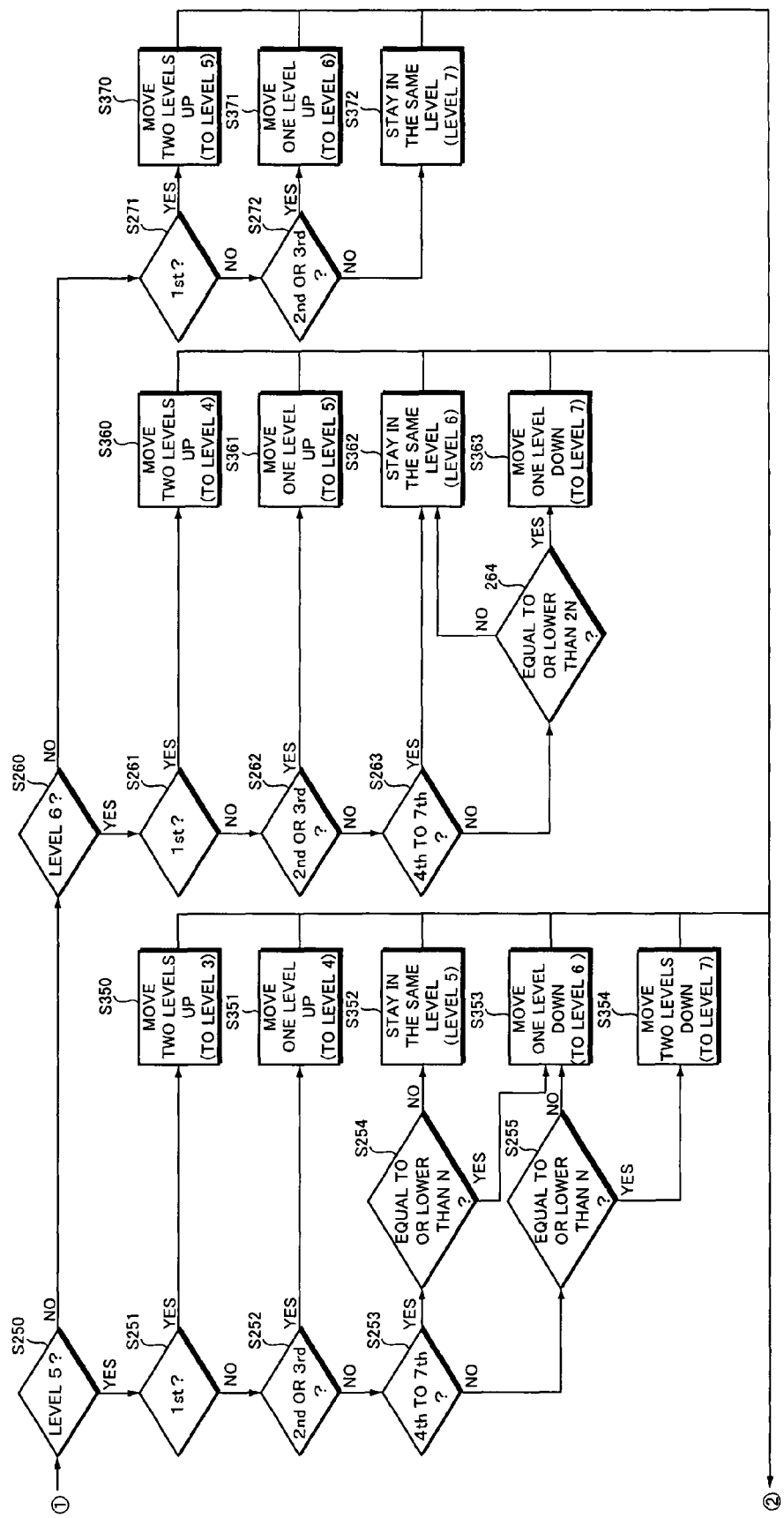
FIG. 13 shows a flowchart explaining the remaining part of the process steps for changing the levels of shops as shown in FIG. 12.

FIG. 12 and FIG. 13 are flowcharts of the above-described steps for changing levels of shops. The flowchart illustrates the details of the shop level determining step S110 in FIG. 9. After the in-group rankings of all the shops have been confirmed at step S100, shops whose levels need to be changed (including when they will remain in the same level) are extracted at step S200.

Next, the levels of these shops are determined at one of Steps S210, S220, S230, S240, S250, and S260 by referring to the shop information database 120.

The process proceeds to one of the respective sequences of the above Steps S210 to S260 depending on which level the shop is determined to be. If the extracted shop is determined to be a Level 1 shop at S210, the process goes successively to S211, S212, and then S213, while if the answer at S210 is negative, the process goes to S220. If the answer at S220 is affirmative (Level 2), the process goes successively to S221, S222, and S223, while the answer at S220 is negative, the process goes to S230. If the answer at S230 is affirmative (Level 3), the process goes successively to S231, S232, and S233, while the answer at S230 is negative, the process goes to S240. If the answer at S240 is affirmative (Level 4), the process goes successively to S241, S242, and S243, while the answer at S240 is negative, the process goes to S250. If the answer at S250 is affirmative (Level 5), the process goes successively to S251, S252, and S253, while the answer at S250 is negative, the process goes to S260. If the answer at S260 is affirmative (Level 6), the process goes successively to S261, S262, and S263, while the answer at S260 is negative (Level 7), the process goes to S271 and S272. These sequences are for determining the in-group rankings of these shops.

If the shop extracted at Step S200 belongs to Level 1, the answer given at S210 is affirmative, and the process goes to next Step S211, where it is determined whether the shop takes first in the group. An affirmative answer at S211 leads to S312, which decides that the shop should remain in the same level (Level 1). The process then goes to Step S300 to store the information in the data record of that shop in the shop information database 120. If the answer is affirmative at Step S210 and negative at Step S211, Step S212 follows which decides whether the shop takes the second or third place within the group. An affirmative answer at S212 leads to S313, which decides that the shop should move one level down (Level 2), and the process proceeds to S300. A negative answer at S212 leads to Step S213, which decides whether the shop takes any of the fourth to seventh places within the group. An affirmative answer at S213 leads to S313, which decides that the shop should move one level down (Level 2), and the process proceeds to S300. A negative answer at S213 leads to Step S314, which decides that the shop should move two levels down (Level 3), and Step S300 follows.

If the shop extracted at Step S200 belongs to Level 2, a negative answer is given at Step S210, and Step S220 follows, where an affirmative answer is given and the process goes to Step S221, where it is determined whether the shop takes first in the group. An affirmative answer at S221 leads to S321, which decides that the shop should move one level up (Level 1) and the process goes to Step S300. If the answer is affirmative at Step S220 and negative at Step S221, Step S222 follows which decides whether the shop takes the second or third place within the group. An affirmative answer at S222 leads to S321, which decides that the shop should move one level up (Level 1), and the process proceeds to S300. A negative answer at S222 leads to Step S223, which decides whether the shop takes any of the fourth to seventh places within the group. An affirmative answer at S223 leads to S323, which decides that the shop should move one level down (Level 3), and the process proceeds to S300. A negative answer at S223 leads to Step S324, which decides that the shop should move two levels down (Level 4), and Step S300 follows.

If the shop extracted at Step S200 belongs to Level 3, a negative answer is given at Step S210, and Step S220 follows, where the answer is negative again, and the process goes to Step S230, where the answer is affirmative and Step S231 follows, which determines whether the shop takes first in the group. An affirmative answer at S231 leads to S330, which decides that the shop should move two levels up (Level 1) and the process goes to Step S300. If the answer is affirmative at Step S230 and negative at Step S231, Step S232 follows which decides whether the shop takes the second or third place within the group. An affirmative answer at S232 leads to S331, which decides that the shop should move one level up (Level 2), and the process proceeds to S300. A negative answer at S232 leads to Step S233, which decides whether the shop takes any of the fourth to seventh places within the group. An affirmative answer at S233 leads to S333, which decides that the shop should move one level down (Level 4), and the process proceeds to S300. A negative answer at S233 leads to Step S334, which decides that the shop should move two levels down (Level 5), and Step S300 follows.

If the shop extracted at Step S200 belongs to Level 4, a negative answer is given at Steps S210, S220, and S230 and Step S240 follows, where an affirmative answer is given and the process goes to Step S241, where it is determined whether the shop takes first in the group. An affirmative answer at S241 leads to S340, which decides that the shop should move two levels up (Level 2) and the process goes to Step S300. If the answer is affirmative at Step S240 and negative at Step S241, Step S242 follows which decides whether the shop takes the second or third place within the group. An affirmative answer at S242 leads to S341, which decides that the shop should move one level up (Level 3), and the process proceeds to S300. A negative answer at S242 leads to Step S243, which decides whether the shop takes any of the fourth to seventh places within the group. An affirmative answer at S243 leads to Step S343, which decides that the shop should move one level down (Level 5), and the process proceeds to S300. A negative answer at S243 leads to Step S344, which decides that the shop should move two levels down (Level 6), and Step S300 follows.

If the shop extracted at Step S200 belongs to Level 5, a negative answer is given at Steps S210, S220, S230, and S240, and Step S250 follows, where an affirmative answer is given and the process goes to Step S251, where it is determined whether the shop takes first in the group. An affirmative answer at S251 leads to S350, which decides that the shop should move two levels up (Level 3) and the process goes to Step S300. If the answer is affirmative at Step S250 and negative at Step S251, Step S252 follows which decides whether the shop takes the second or third place within the group. An affirmative answer at S252 leads to S351, which decides that the shop should move one level up (Level 4), and the process proceeds to S300. A negative answer at S252 leads to Step S253, which decides whether the shop takes any of the fourth to seventh places within the group. An affirmative answer at S253 leads to Step S254, which determines how many shops have preceded the shop in question at Step S254, and whether the number of the shops that have reached Step S254 is equal to or lower than N, which is the number of groups in Level 7. A negative answer at S254 leads to S352, which decides that the shop should remain in the same level (Level 5), and the process goes to S300. If the answer is affirmative at S254, Step S353 follows, which decides that the shop should move one level is down (Level 6), and the process proceeds to S300. A negative answer at S253 leads to Step S255, which, similarly to Step S254, determines how many shops have preceded the shop in question at Step S255, and whether the number of the shops which have reached Step S255 is equal to or lower than N, which is the number of groups in Level 7. A negative answer at S255 leads to S353, which decides that the shop should move one level down (Level 6), and the process goes to S300. If the answer is affirmative at S255, Step S354 follows, which decides that the shop should move two levels down (Level 7), and Step S300 follows.

If the shop extracted at Step S200 belongs to Level 6, a negative answer is given at Steps S210, S220, S230, S240, and S250, and Step S260 follows, where an affirmative answer is given and the process goes to Step S261, where it is determined whether the shop takes first in the group. An affirmative answer at S261 leads to S360, which decides that the shop should move two levels up (Level 4) and the process goes to Step S300. If the answer is affirmative at Step S260 and negative at Step S261, Step S262 follows which decides whether the shop takes the second or third place within the group. An affirmative answer at S262 leads to S361, which decides that the shop should move one level up (Level 5), and the process proceeds to S300. A negative answer at S262 leads to Step S263, which decides whether the shop takes any of the fourth to seventh places within the group. An affirmative answer at S263 leads to S362, which decides that the shop should remain in the same level (Level 6), and the process goes to S300. A negative answer at S263 leads to Step S264, which determines how many shops have preceded the shop in question at Step S264, and whether the number of the shops which have reached Step S264 is equal to or lower than 2N, which is twice the number of groups in Level 7. A negative answer at S264 leads to S362, which decides that the shop should remain in the same level (Level 6), and the process goes to S300. If the answer is affirmative at S264, Step S363 follows, which decides that the shop should move one level down (Level 7), and the process proceeds to S300.

If the shop extracted at Step S200 belongs to Level 7, a negative answer is given at Steps S210, S220, S230, S240, and S250, and Step S260 follows, where a negative answer is given and the process goes to Step S271, where it is determined whether the shop takes first in the group. An affirmative answer at S271 leads to S370, which decides that the shop should move two levels up (Level 5) and the process goes to Step S300. If the answer is negative both at Step S260 and at Step S271, Step S272 follows which decides whether the shop takes the second or third place within the group. An affirmative answer at S272 leads to S371, which decides that the shop should move one level up (Level 6), and the process proceeds to S300. A negative answer at S272 leads to Step S372, which decides that the shop should remain in the same level (Level 7), and the process goes to S300.

At Step S300, the new levels of these shops thus determined (including when the shops remain in the same level) are stored in the shop information database 120.

Referring back to FIG. 9, the levels of all the shops are determined (S120) based on the in-group shop rankings which have been confirmed after a week's interval as mentioned above. Next, it is determined which shop should belong to which group at each level (S130). Groups at the same level are all equal, including the shops which have moved from other levels, and therefore the shops can be grouped in any suitable manner. For example, they can be mechanically divided into groups of eleven shops on the basis of their area information such as postal codes or area codes of fixed-line phones.

After all the shops have been grouped, the current points of all the shops are reset to zero (S140), the group ranking chart 131 is renewed (S150), and the timer is set (S20), to start another competition for the next one-week period.

Another embodiment of the present invention, in which the shops each have only one member player, can be considered equivalent to the above embodiment of the present invention. In this case, shop requirements will be player requirements, the in-group shop rankings correspond to in-group player rankings, and the in-group ranking chart of the shops will be that of players.

More specifically, the ranking chart would have seven levels (first to seventh), Level 1 having one group, Level 2 having two groups, Level 3 having four groups, Level 4 having eight groups, Level 5 having sixteen groups, Level 6 having thirty-two groups, and Level 7 having a maximum of sixty-four groups. Each group consists of eleven players. A database connected to or built in a server is allocated a region for storing player information including the results of the games the players have played and their group information, so that in-group player rankings are determined based on the players' game results.

The server acquires a result at the end of each played game and compares the result with existing results of other players within the group to which the player who has played the game belongs, to decide the player's ranking in this group, based on which the in-group player ranking chart is renewed.

At a preset time interval of, for example, one week, the player ranking is renewed, based on which the server decides which player should be placed at which level in the next ranking chart, and determines which player should belong to which group at respective levels.

According to this embodiment, players will be more interested in the ranking system because the ranking chart directly indicates their rankings.

As described above, the ranking determination system of the present invention can make all the game participants ranking-conscious and eager to play the game again even if the game is a widely popular game played by a large number of people.

The present invention is not limited to the above-described network game system, but can also be applied to a sales evaluation system or the like of a sales shop which has many outlets all over the country.

While there has been described what are at present considered to be preferred embodiments of the present invention, it will be understood that various modifications may be made thereto, and it is intended that appended claims cover all such modifications as fall within the true spirit and scope of the present invention.

What is claimed is:

1. A ranking determination system comprising a server connected to a communication network and a game machine which can transmit and receive information to and from said server through said communication network, wherein said game machine sends game results of players to said server, and said server determines a ranking of respective teams of the players who have played the game based on the game results, and wherein said server comprises:
   storage means for storing a ranking chart with a plurality of levels, each level containing one or more groups of a preset number of teams, each team being allocated a region for storing one or more sets of player information including a result of a game played by a player and information of the player's team;
   game result collecting means for acquiring said game result from the game machine with which the game has been played;
   player ranking determination means for comparing said game result collected by said game result collecting means with existing game results of other players within the same group containing the team of the player who has played said game to determine an in-group ranking of said player;
   team ranking renewing means for calculating an in-group ranking of said team of said player based on the player's ranking determined by said player ranking determination means and for renewing said in-group ranking of the team;
   ranking chart renewing means for renewing said in-group ranking based on said in-group ranking of the team renewed by said team ranking renewing means;
   team level determination means for determining at which level each team should be placed based on said ranking of the team being renewed at a preset time interval; and
   team group determination means for determining to which group each team should belong at the level determined by said team level determination means.

2. The ranking determination system according to claim 1, wherein
   said team ranking renewing means comprises:
   team point determination means for determining how many points should be given to said team of the player who has played the game based on the player's ranking determined by said player ranking determination means;
   team point renewing means for adding the points determined by said team point determination means to the points currently owned by said team and for renewing and storing the new points as said team's current points;
   team ranking determination means for comparing said team's current points renewed by said team point renewing means with the current points of other teams in the group to which said team belongs to determine said team's ranking within said group; and
   ranking chart resetting means for resetting all said teams' points and renewing said ranking chart after said team group determination means has decided to which group each team should belong.

3. The ranking determination system according to claim 1, wherein
   said team ranking renewing means comprises:
   team point determination means for determining how many points should be given to the team of said player based on the player's ranking determined by said player ranking determination means;
   team point renewing means for adding the points determined by said team point determination means to the points currently owned by said team and for renewing and storing the new points as the team's current points; and
   team ranking determination means for comparing said team's current points renewed by said team point renewing means with current points of other teams in the group to which the team belongs to determine the team's ranking within said group.

4. A ranking determination system comprising a server connected to a communication network and a game machine which can transmit and receive information to and from said server through said communication network, wherein said game machine sends game results of players to said server, and said server determines a ranking of respective players who have played the game based on the game results, and wherein said server comprises:
   storage means for storing a ranking chart with a plurality of levels, each level containing one or more groups of a preset number of players, each group being allocated a region for storing one or more sets of player information including a result of a game played by a player and information of the player's group;
   game result collecting means for acquiring said game result from a game machine with which the game has been played;
   player ranking determination means for comparing said game result collected by said game result collecting means with existing game results of other players within the group of the player who has played said game to determine an in-group ranking of said player;
   team ranking renewing means for calculating an in-group ranking of said team of said player based on the player's ranking determined by said player ranking determination means and for renewing said in-group ranking of the team;
   ranking chart renewing means for renewing said in-group ranking based on said in-group ranking of the team renewed by said team ranking renewing means, and renewing said in-group ranking based on the player's ranking which is determined by said player ranking determination means;

team level determination means for determining at which level each team should be placed based on said ranking of the team being renewed at a preset time interval;

team group determination means for determining to which group each team should belong at the level determined by said team level detenuination means;

player level determination means for determining at which level each player should be placed based on said player ranking renewed at a preset time interval; and player group determination means for determining to which group each player should belong at the level determined by said player level determination means.

5. A non-transitory computer readable storage medium having a ranking determination program, for enabling a computer to function as a server which determines a ranking of respective teams of game players based on game results sent from a game machine which can transmit and receive information to and from the server through a communication network, wherein said computer is allowed to function as storage means for storing a ranking chart with a plurality of levels, each level containing one or more groups of a preset number of said teams, each team being allocated a region for storing one or more sets of player information including a result of a game played by a player and information of the player's team;

game result collecting means for acquiring said game result from the game machine with which the game has been played;

player ranking determination means for comparing said game result collected by said game result collecting means with existing game results of other players within the same group containing the team of the player who has played said game to determine an in-group ranking of said player;

team ranking renewing means for calculating an in-group ranking of the team of said player based on the player's ranking determined by said player ranking determination means and for renewing said in-group ranking of the team;

ranking chart renewing means for renewing said in-group ranking based on said in-group ranking of the team renewed by said team ranking renewing means;

team level determination means for determining at which level each team should be placed based on said ranking of the team being renewed at a preset time interval; and team group determination means for determining to which group each team should belong at the level determined by said team level determination means.

6. The non-transitory computer readable storage medium ranking determination program according to claim 5, wherein said computer is allowed to function as team point determination means for determining how many points should be given to the team of said player who has played the game based on the player's ranking determined by said player ranking determination means;

team point renewing means for adding the points determined by said team point determination means to the points currently owned by said team and for renewing and storing the new points as said team's current points;

team ranking determination means for comparing said team's current points renewed by said team point renewing means with the current points of other teams in the group to which said team belongs to determine the team's ranking within said group; and ranking chart resetting means for resetting all said teams' points and renewing said ranking chart after said team group determination means has decided to which group each team should belong.

7. The non-transitory computer readable storage medium according to claim 5, wherein said computer is allowed to function as team point determination means for determining how many points should be given to the team of said player who has played the game based on the player's ranking determined by said player ranking determination means;

team point renewing means for adding the points determined by said team point determination means to the points currently owned by said team and for renewing and storing the new points as said team's current points; and team ranking determination means for comparing said team's current points renewed by said team point renewing means with the current points of other teams in the group to which said team belongs to determine the team's ranking within said group.

8. A non-transitory ranking determination program, for enabling a computer to function as a server which determines a ranking of game players based on game results sent from a game machine which can transmit and receive information to and from said server through a communication network, wherein said computer is allowed to function as storage means for storing a ranking chart with a plurality of levels, each level containing one or more groups of a preset number of players, each group being allocated a region for storing one or more sets of player information including a result of a game played by a player and information of the player's group;

game result collecting means for acquiring said game result from the game machine with which the game has been played;

player ranking determination means for comparing said game result collected by said game result collecting means with existing game results of other players within the group of the player who has played said game to determine an in-group ranking of said player;

team ranking renewing means for calculating an in-group ranking of said team of said player based on the player's ranking determined by said player ranking determination means and for renewing said in-group ranking of the team;

ranking chart renewing means for renewing said in-group ranking based on said in-group ranking of the team renewed by said team ranking renewing means, and renewing said in-group ranking based on said player's ranking which is determined by said player ranking determination means;

team level determination means for determining at which level each team should be placed based on said ranking of the team being renewed at a preset time interval;

team group determination means for determining to which group each team should belong at the level determined by said team level determination means;

player level determination means for determining at which level each player should be placed based on said player ranking which is renewed at a preset time interval; and player group determination means for determining to which group each player should belong at the level determined by said player level determination means.

* * * * *